(12) United States Patent
Origuchi et al.

(10) Patent No.: US 8,421,714 B2
(45) Date of Patent: Apr. 16, 2013

(54) PLASMA DISPLAY DEVICE AND METHOD FOR DRIVING PLASMA DISPLAY PANEL

(75) Inventors: Takahiko Origuchi, Osaka (JP); Hidehiko Shoji, Osaka (JP)

(73) Assignee: Panasonic Corporation, Osaka (JP)

( * ) Notice: Subject to any disclaimer, the term of this patent is extended or adjusted under 35 U.S.C. 154(b) by 913 days.

(21) Appl. No.: 12/295,365

(22) PCT Filed: Dec. 14, 2007

(86) PCT No.: PCT/JP2007/074085
§ 371 (c)(1),
(2), (4) Date: Sep. 30, 2008

(87) PCT Pub. No.: WO2008/081698
PCT Pub. Date: Jul. 10, 2008

(65) Prior Publication Data
US 2009/0179884 A1      Jul. 16, 2009

(30) Foreign Application Priority Data
Dec. 28, 2006   (JP) .................................. 2006-354273

(51) Int. Cl.
G09G 3/28      (2006.01)
(52) U.S. Cl.
USPC ............................... 345/63; 345/68; 345/211
(58) Field of Classification Search .................. 345/212, 345/60–72, 76, 98; 315/169.1, 169.4
See application file for complete search history.

(56) References Cited

U.S. PATENT DOCUMENTS

| | | | |
|---|---|---|---|
| 6,512,501 B1 | 1/2003 | Nagaoka et al. | |
| 7,133,008 B2 | 11/2006 | Naganuma | |
| 7,358,931 B2 | 4/2008 | Mizobata et al. | |
| 7,453,423 B2 | 11/2008 | Mizobata | |
| 7,468,713 B2 | 12/2008 | Ogawa et al. | |
| 7,471,264 B2 | 12/2008 | Inoue et al. | |

(Continued)

FOREIGN PATENT DOCUMENTS

| JP | 11-133913 A | 5/1999 |
|---|---|---|
| JP | 2000-242224 A | 9/2000 |

(Continued)

OTHER PUBLICATIONS

International Search Report for PCT/JP2007/074085, dated Mar. 18, 2008.

(Continued)

*Primary Examiner* — Alexander S Beck
*Assistant Examiner* — Charles Zheng
(74) *Attorney, Agent, or Firm* — RatnerPrestia

(57) ABSTRACT

A stable address discharge in a plasma display device is generated without increased voltage to cope with increase in the cumulative current-carrying time of a panel with high luminance. A cumulative time calculating circuit for calculating cumulative current-carrying time of the panel and a driving circuit for driving the panel. The driving circuit delivers collected power to the display electrode pairs and clamps each voltage of the display electrode pairs to power-supply voltage and base potential. A sustain period has a period, during which the voltage of the display electrode pairs is clamped to base potential, between the sustain pulse for generating the last sustain discharge in the sustain period and the immediately preceding sustain pulse. The length of the period is changed according to the cumulative current-carrying time calculated by the cumulative time calculating circuit.

7 Claims, 9 Drawing Sheets

U.S. PATENT DOCUMENTS

| | | | |
|---|---|---|---|
| 7,688,287 B2 | 3/2010 | Tokunaga et al. | |
| 7,911,421 B2 * | 3/2011 | Jung et al. | 345/68 |
| 2003/0001804 A1 * | 1/2003 | Naganuma | 345/63 |
| 2005/0068262 A1 * | 3/2005 | Mizobata et al. | 345/60 |
| 2005/0162348 A1 | 7/2005 | Ogawa et al. | |
| 2005/0231440 A1 | 10/2005 | Inoue et al. | |
| 2005/0285820 A1 | 12/2005 | Inoue et al. | |
| 2006/0022602 A1 * | 2/2006 | Han | 315/169.1 |
| 2006/0066518 A1 | 3/2006 | Mizobata | |
| 2006/0066519 A1 * | 3/2006 | Tokunaga et al. | 345/63 |
| 2006/0152442 A1 | 7/2006 | Chi | |
| 2009/0021452 A1 * | 1/2009 | Takeda et al. | 345/60 |
| 2009/0135172 A1 * | 5/2009 | Shoji et al. | 345/212 |

FOREIGN PATENT DOCUMENTS

| | | |
|---|---|---|
| JP | 2001-228821 A | 8/2001 |
| JP | 2001-272946 A | 10/2001 |
| JP | 2002-366090 A | 12/2002 |
| JP | 2003-15590 A | 1/2003 |
| JP | 2003 15590 A | 1/2003 |
| JP | 2003-122294 A | 4/2003 |
| JP | 2004-206094 A | 7/2004 |
| JP | 2005-10227 A | 1/2005 |
| JP | 2005-77744 A | 3/2005 |
| JP | 2005-234372 A | 9/2005 |
| JP | 2006-3398 A | 1/2006 |
| JP | 2006-31024 A | 2/2006 |
| JP | 2006-91133 A | 4/2006 |
| JP | 2006-91437 A | 4/2006 |
| JP | 2006-195461 A | 7/2006 |
| JP | 2006-201735 A | 8/2006 |

OTHER PUBLICATIONS

JP Office Action for 2007-557826, Mar. 29, 2011.
JP Office Action for 2008-524297, Jul. 19, 2011.

* cited by examiner

| Cumulative ON-time | Base-potential period ThG |
|---|---|
| Below 500h | 0nsec |
| 500h or greater | 500nsec |

PLASMA DISPLAY DEVICE AND METHOD FOR DRIVING PLASMA DISPLAY PANEL

This application is a U.S. National Phase Application of PCT International Application PCT/JP2007/074085.

TECHNICAL FIELD

The present invention relates to a plasma display device used for wall-mounted TVs or large monitors and also relates to a method for driving a plasma display panel.

BACKGROUND ART

An AC-type surface discharge plasma display panel has become dominance in plasma display panels (hereinafter simply referred to as a panel). A panel contains a front plate and a rear plate oppositely disposed with each other and a plurality of discharge cells therebetween. On the front plate, a plurality of display electrode pairs, each made of a scan electrode and a sustain electrode, are formed on a front glass substrate in parallel with each other. A dielectric layer and a protective layer are formed to cover these display electrode pairs. On the rear plate, a plurality of data electrodes are disposed in a parallel arrangement, and over which, a dielectric layer is formed to cover the data electrodes. On the dielectric layer, barrier ribs are formed in parallel with the data electrodes. A phosphor layer is formed on the dielectric layer and on the side surfaces of the barrier ribs. The front plate and the back plate are sealed with each other so that the display electrode pairs are orthogonal to the data electrodes in a discharge space between the two plates. The discharge space is filled with discharge gas, for example, a gas containing 5% xenon in a ratio of partial pressure. The discharge cells are formed at which the display electrode pairs face data electrodes. In the panel structured above, a gas discharge occurs in each discharge cell and generates ultraviolet light, which excites phosphors for red (R), green (G) and blue (B) to generate visible light of respective colors.

In the typical panel operation, one-field is divided into a plurality of sub-fields, which is known as a sub-field method. According to the sub-field method, gradation display on the panel is attained by combination of the sub-fields to be lit.

Each sub-field has an initializing period, an address period and a sustain period. In the initializing period, an initializing discharge occurs in the discharge cells. The initializing discharge generates wall charge on each electrode as a preparation for an address operation in the address period that follows the initializing period; at the same time, the initializing discharge generates a priming particle (as an initiating agent, i.e., an excitation particle). In the address period, an address discharge selectively occurs in a cell to be ON to form the wall charge (hereinafter, the operation may be referred to as an address operation) by applying address pulses. In the sustain period, sustain pulses are alternately applied between the scan electrodes and the sustain electrodes of the display electrode pairs. The applied pulses generates a sustain discharge in the cells in which the wall charges have been formed in the previous address discharge and excites the phosphor layer of the cells. Through the process above, image is shown on the panel.

In the sub-field methods, a suggestion on improvement has been made. According to the disclosure, after generating an initializing discharge by applying a gradually varying waveform voltage, another initializing discharge is selectively generated in the discharge cell where an address discharge occurred in the address period. The driving method can suppress light-emitting with no contribution to gradation display and therefore improves contrast ratio.

According to the method above, an initializing operation in which the initializing discharge occurs in all the discharge cells (hereinafter, all-cell initializing operation) is carried out in the initializing period of one sub-field in a plurality of sub-fields. In the rest of the sub-fields, the initializing discharge is selectively generated only in a cell where a sustain discharge occurred in the previous sustain period (hereinafter, selective-cell initializing operation). Driving a panel with the method above can suppress unwanted light-emitting with no contribution to gradation display. That is, the area being responsible for black color (hereinafter, black luminance) has substantially no light-emission except for a weak emission caused by the all-cell initializing operation, so that contrast ratio in image greatly improves (see patent reference 1, for example).

Besides, patent reference 1 describes an efficient use of sustain pulses having a width narrower than that of other sustain pulses, known as a narrow-width erase discharge. Applying the narrow-width sustain pulses at the end of the sustain period reduces difference in voltage between the display electrode pairs that is caused by wall charges. Maintaining stability of the narrow-width erase discharge ensures reliable address operations in the address period of the successive sub-field, allowing a plasma display device to have high contrast ratio.

As a recent trend of panels that become larger in size and higher in resolution, manufacturers are seeking for further excellent image display. Providing a panel with higher emission luminance allows the panel to have excellent image quality. To obtain higher luminance, increasing the ratio of xenon partial pressure is known as an effective way. Increase in the partial pressure ratio of xenon, however, also increases voltage required for address operations, which has often led unstable address operations. Besides, characteristics of a panel vary according to cumulative time of current-carrying panel (hereinafter, cumulative current-carrying time). Increase in cumulative current-carrying time also increases address pulse voltage for generating a stable address discharge. That is, for stable address operations, address pulse voltage has to be set higher for longer cumulative current-carrying time of a panel.

patent reference 1: Japanese Unexamined Patent Application Publication No. 2000-242224

SUMMARY OF THE INVENTION

The plasma display device of the present invention has a panel with a plurality of discharge cells having display electrode pairs, each pair is formed of a scan electrode and a sustain electrode, a cumulative time calculating circuit for calculating cumulative current-carrying time of the panel, and a driving circuit for driving the panel. The panel-driving circuit has a sustain-pulse generating circuit that contains a power-recovery circuit and a clamping circuit. The power-recovery circuit collects power built up in an inter-electrode capacitor of the display electrode pairs and supplies the power to the display electrode pairs. The clamping circuit clamp, each voltage of the display electrode pairs to power-supply voltage and base potential. In the panel operation with the structure above, a sustain period has a base-potential period, during which the voltage of the display electrode pairs is clamped to base potential, between the sustain pulse for generating the last sustain discharge in the sustain period and the immediately preceding sustain pulse. Besides, the length of the base-potential period is changed according to the cumulative current-carrying time calculated by the cumulative time calculating circuit.

As described above, the base-potential period, where the display electrode pairs are clamped to base potential, provided between the sustain pulse for generating the last sustain discharge in the sustain period and the immediately preceding sustain pulse is changed in length according to the cumulative current-carrying time of a panel. The structure eliminates the problem that address pulse voltage has to be set higher for longer cumulative current-carrying time of a panel, allowing the panel to have a stable address discharge.

REFERENCE MARKS IN THE DRAWINGS

Figure 1:
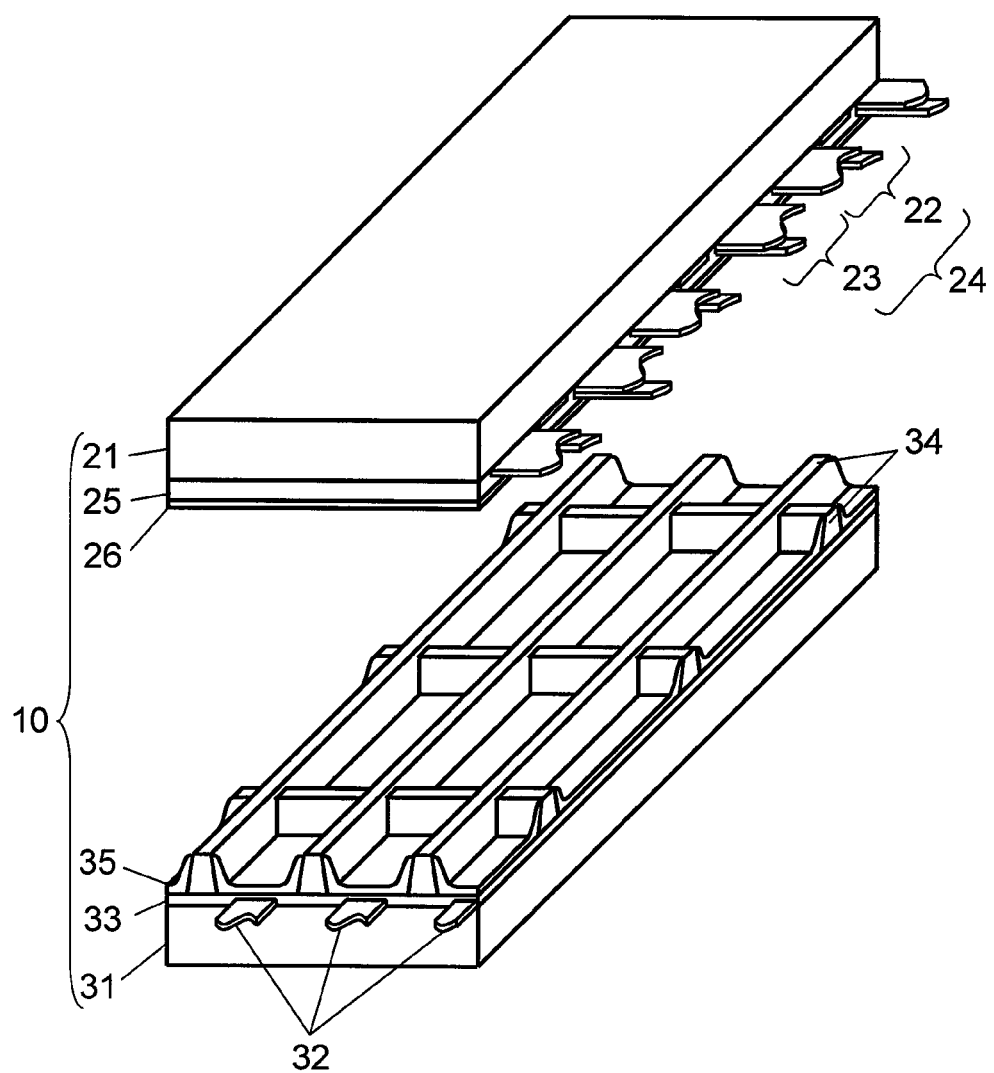
FIG. 1 is an exploded perspective view showing the structure of a panel in accordance with an exemplary embodiment of the present invention.

1 plasma display device
10 panel
21 (glass-made) front plate
22 scan electrode
23 sustain electrode
24 display electrode pair
25, 33 dielectric layer
26 protective layer
31 rear plate
32 data electrode
34 barrier rib
35 phosphor layer
41 image-signal processing circuit
42 data-electrode driving circuit
43 scan-electrode driving circuit
44 sustain-electrode driving circuit
45 timing-signal generating circuit
48 cumulative time calculating circuit
50, 60 sustain-pulse generating circuit
51, 61 power-recovery circuit
52, 62 clamping circuit
81 timer
Q11, Q12, Q13, Q14, Q21, Q22, Q23, Q24, Q26, Q27, Q28, Q29 switching element
C10, C20, C30 capacitor
L10, L20 inductor
D11, D12, D21, D22, D30 diode
VE1, ΔVE power supply

DETAILED DESCRIPTION OF THE PREFERRED EMBODIMENTS

The plasma display device of an exemplary embodiment of the present invention is described hereinafter with reference to the accompanying drawings.

Exemplary Embodiment

FIG. 1 is an exploded perspective view showing the structure of panel 10 in accordance with the exemplary embodiment of the present invention. On glass-made front plate 21, a plurality of display electrode pairs 24 of scan electrodes 22 and sustain electrodes 23 are arranged, and over which, dielectric layer 25 and protective layer 26 are formed to cover scan electrodes 22 and sustain electrodes 23.

Protective layer 26 has a proven performance as a material of a panel being effective in reducing discharge-start voltage in a discharge cell. Specifically, the material is mainly composed of magnesium oxide (MgO) having a large coefficient of secondary electron emission and excellent durability when the discharge space is filled with a discharge gas containing neon (Ne) and xenon (Xe).

On rear plate 31, a plurality of data electrodes 32 are disposed, and over which, dielectric layer 33 is formed to cover data electrodes 32. On dielectric layer 33, barrier ribs 34 are formed in a grid arrangement. Phosphor layer 35, which is responsible for emitting light in red (R), green (G) and blue (B), is formed on dielectric layer 33 and on the side surfaces of barrier ribs 34.

Front plate 21 and rear plate 31 are oppositely disposed in a manner that display electrode pairs 24 are placed orthogonal to data electrodes 32 in a narrow discharge space between the two plates, and are sealed at the peripheries with a sealing material such as glass frit. The discharge space is filled with discharge gas, for example, a gas mixed xenon with neon. The structure of the embodiment employs a discharge gas with a xenon partial pressure of 10%. The discharge space is divided into sections by barrier ribs 34. Discharge cells are formed at intersections of display electrode pairs 24 and data electrodes 32. Generating discharge allows a discharge cell to emit light, so that an image appears on the panel.

Panel 10 does not necessarily have the structure above. For example, the barrier ribs may be formed into stripes. Similarly, the discharge gas does not necessarily have the mixing ratio above.

Figure 2:
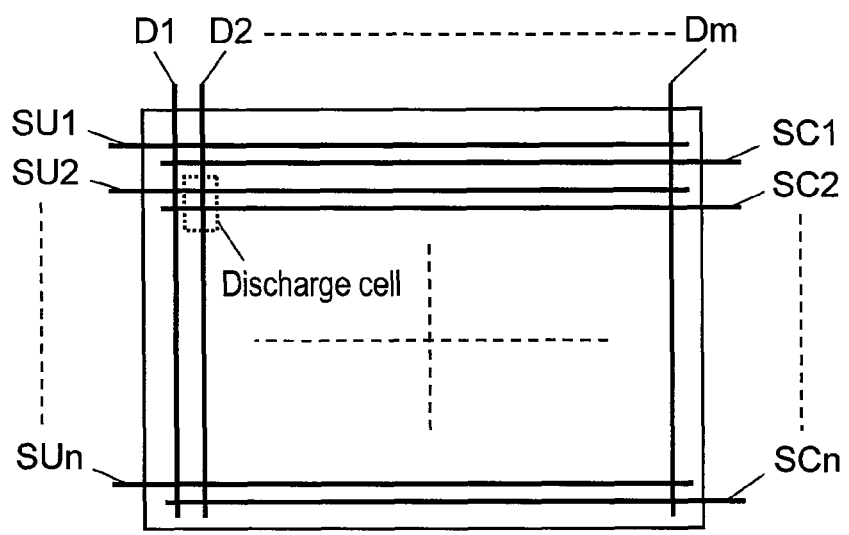
FIG. 2 shows arrangement of electrodes of the panel in accordance with the exemplary embodiment.

FIG. 2 shows arrangement of the electrodes on panel 10 in accordance with the embodiment. In the horizontal direction, panel 10 has n long scan electrodes SC1-SCn (corresponding to scan electrodes 22 in FIG. 1) and n long sustain electrodes SU1-SUn (corresponding to sustain electrodes 23 in FIG. 1). In the vertical direction, panel 10 has m long data electrodes D1-Dm (corresponding to data electrodes 32 in FIG. 1). A discharge cell is formed at an intersection of a pair of scan electrode SCi and sustain electrode SUi (where, i takes 1 to n) and data electrode Dj (where, j takes 1 to m). That is, panel 10 contains m×n discharge cells in the discharge space. As shown in FIG. 1 and FIG. 2, scan electrode SCi and sustain electrode SUi are formed as a pair and disposed in parallel with each other; a large inter-electrode capacitor Cp is formed between scan electrodes SC1-SCn and sustain electrodes SU1-SUn.

Next will be described waveforms of driving voltage for driving panel 10 and the workings of them. The plasma display device of the embodiment employs a sub-field method to provide gradation display. In the sub-field method, one-field is divided into a plurality of sub-fields. Light-emitting control of the discharge cells is carried out on a sub-field basis. Each sub-field has an initializing period, an address period and a sustain period.

The initializing period is responsible for generating an initializing discharge to form wall charges on each electrode as a preparation for an address discharge to be generated in the address period. At the same time, the initializing period is responsible for generating a priming particle (as an initiating agent of discharge, i.e., an excitation particle). The priming particle reduces delay in discharge and contributes to generation of a stable address discharge. In the initializing period, two types of initializing operations are selectively carried out: an all-cell initializing operation in which the initializing discharge is generated in all of the cells, and a selective-cell initializing operation in which the initializing discharge is generated in a cell where a sustain discharge has been generated in the previous sustain period.

In the address period, applying the voltage selectively causes an address discharge in a discharge cell to be lit and forms wall charges. In the sustain period, sustain pulses are alternately applied to display electrode pairs 24 so that a sustain discharge is generated in the discharge cell where an address discharge has been generated. The number of the sustain pulses applied to the display electrodes corresponds to a luminance weight for light emitting, where the proportionality constant is called a luminance factor. In this way, a discharge cell where the sustain discharge has been generated emits light.

Descriptions in the embodiment will be given on the assumption that one-field is divided into ten sub-fields from the first sub-field (1SF) to the tenth sub-field (10SF) and 1SF through 10SF have the following luminance weights in the order named: 1, 2, 3, 6, 11, 18, 30, 44, 60 and 80. In the embodiment, 1SF is the all-cell initializing sub-field, while 2SF through 10SF are the selective-cell initializing sub-fields. In the sustain period of each sub-field, sustain pulses are applied to display electrode pairs 24, where the number of sustain pulses to be applied to each electrode is calculated by multiplying the luminance weight of each sub-field by predetermined luminance factor.

The number of sub-fields and luminance weight assigned to each sub-field are not limited to the aforementioned values. Besides, the structure of sub-fields can be changed according to an image signal or the like.

In the structure of the embodiment, the timing of generating an erase discharge at the end of a sustain period is determined according to the cumulative current-carrying time of panel 10 calculated by the cumulative time calculating circuit. To be specific, when the cumulative current-carrying time of panel 10 exceeds a predetermined period, the structure of the embodiment effects timing control of finally applying sustain pulse voltage so as to lag behind the applied timing that is determined for the cumulative current-carrying time not greater than the predetermined period. The timing control above eliminates the need for setting address pulse voltage higher to cope with increase in the cumulative current-carrying time of a panel, allowing the panel (even it is a panel with high luminance) to have a stable address discharge. Next will be briefly described on waveforms of driving voltage, and after that, will be described on difference in waveforms of driving voltage according to the length of cumulative current-carrying time of a panel.

Figure 3:
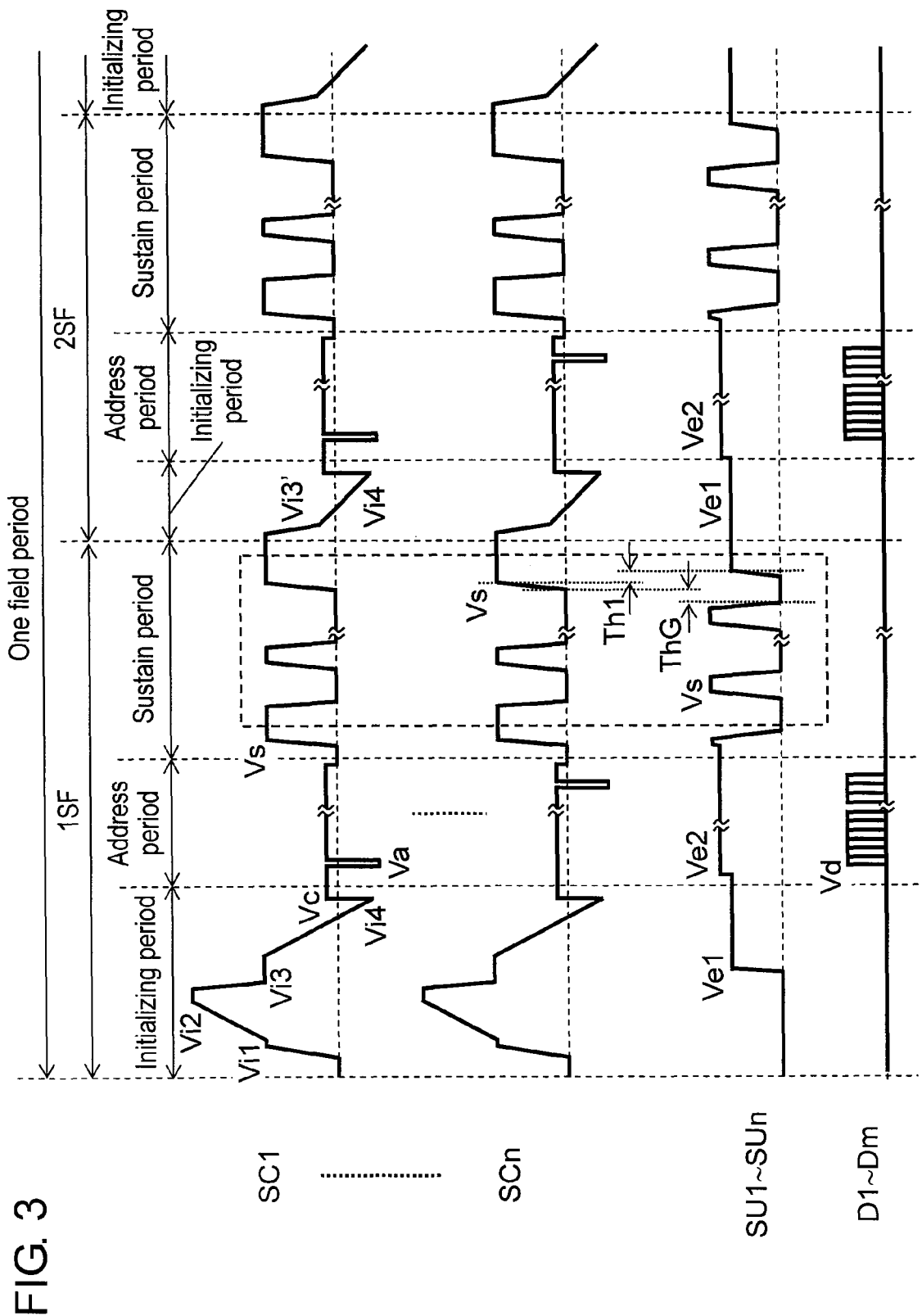
FIG. 3 shows waveforms of driving voltage to be applied to each electrode of the panel with the exemplary embodiment.
Figures 4, 5:
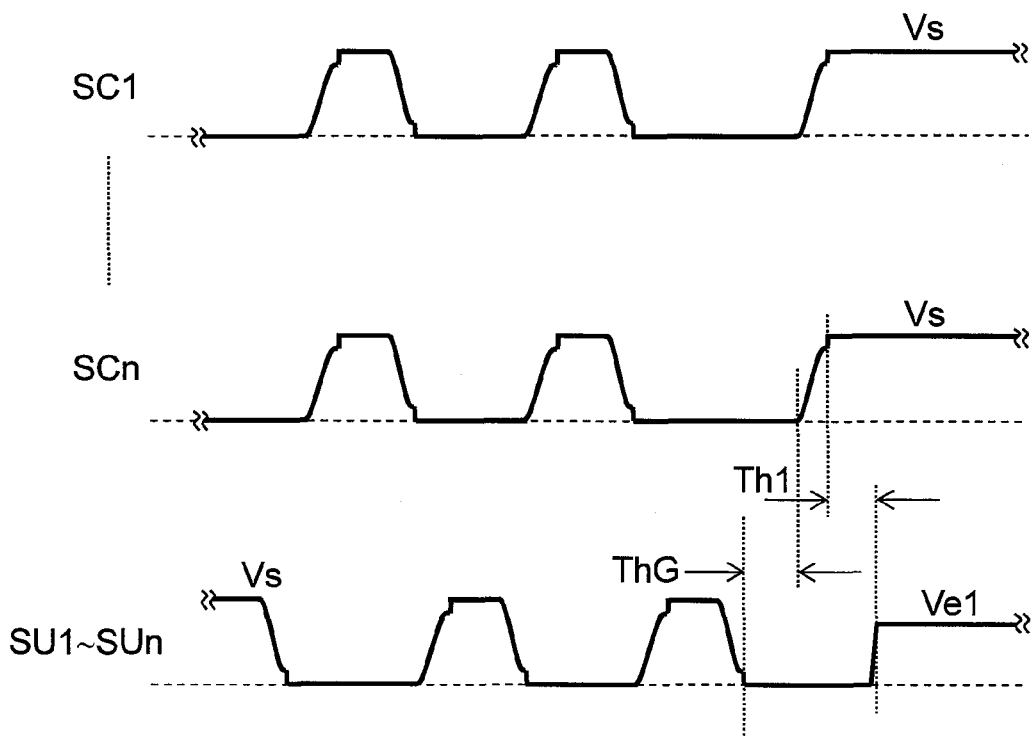
FIG. 4 is a partially enlarged view of the waveforms of driving voltage to be applied to each electrode of the panel with the exemplary embodiment.
FIG. 5 shows correspondence between the cumulative current-carrying time of a panel and base-potential period ThG of the embodiment.

FIG. 3 shows waveforms of driving voltage to be applied to each electrode of panel 10 of the embodiment. FIG. 4 is a partially enlarged view of FIG. 3. FIG. 3 shows the waveforms of driving voltage to be applied in the two sub-fields: a sub-field for carrying out an all-cell initializing operation (hereinafter, an all-cell initializing sub-field) and a sub-field for carrying out a selective-cell initializing operation (hereinafter, a selective-cell initializing sub-field). The rest of the sub-fields also have waveforms similar to those shown in FIG. 3. FIG. 4 shows an enlarged view of the part surrounded by dotted lines in FIG. 3 in the end stage of a sustain period.

First will be described 1SF as the all-cell initializing sub-field. In the first half of the initializing period of 1SF, voltage of zero (0V) is applied to data electrodes D1-Dm and sustain electrodes SU1-SUn, while a voltage applying to scan electrodes SC1-SCn which is gradually increasing waveform (hereinafter, rising-ramp voltage), starting from voltage Vi1 (that is lower than the discharge-start voltage for sustain electrodes SU1-SUn) toward voltage Vi2 (that exceeds the discharge-start voltage). During the rising-ramp voltage is applying to scan electrodes SC1-SCn, a weak initializing discharge repeatedly occurs between scan electrodes SC1-SCn, sustain electrodes SU1-SUn and data electrodes D1-Dm. Through the initializing discharge, negative wall voltage is built up on scan electrodes SC1-SCn, on the other hand, positive wall voltage is built up on data electrodes D1-Dm and sustain electrodes SU1-SUn. The wall voltage on each electrode represents a voltage generated by wall charges built up on the dielectric layer, the protective layer and the phosphor layer on the electrodes.

In the latter half of the initializing period, positive voltage Ve1 is applied to sustain electrodes SU1-SUn, and the voltage of zero (0V) is applied to data electrodes D1-Dm. Applied to scan electrodes SC1-SCn is a voltage with gradually decreasing waveform (hereinafter, falling-ramp voltage), starting from voltage Vi3 (that is lower than the discharge-start voltage for sustain electrodes SU1-SUn) toward voltage Vi4 (that exceeds the discharge-start voltage). During the falling-ramp voltage is applying, a weak initializing discharge repeatedly occurs between scan electrodes SC1-SCn, sustain electrodes SU1-SUn and data electrodes D1-Dm. Through the discharge, the negative wall voltage on scan electrodes SC1-SCn and the positive wall voltage on sustain electrodes SU1-SUn are weakened. On the other hand, the positive wall voltage on data electrodes D1-Dm is adjusted to a value suitable for the address operation. In this way, the initializing discharge given on all the discharge cells, i.e., the all-cell initializing operation is completed.

In the address period that follows the initializing period, voltage Ve2 is applied to sustain electrodes SU1-SUn and voltage Vc is applied to scan electrodes SC1-SCn.

Next, negative scan pulse voltage Va is applied to scan electrode SC1 located at the first row, and positive address pulse voltage Vd is applied to data electrode Dk (k takes 1 to m), which corresponds to the discharge cell to be lit at the first row. At this time, difference in voltage at the intersection of data electrode Dk and scan electrode SC1 is calculated by adding the difference in wall voltage between data electrode Dk and scan electrode SC1 to the difference in voltage applied from outside (i.e., Vd−Va). The calculated value exceeds the discharge-start voltage, thereby generating an address discharge between data electrode Dk and scan electrode SC1. As described above, voltage Ve2 is applied to sustain electrodes SU1-SUn. The difference in voltage between sustain electrode SU1 and scan electrode SC1 is calculated by adding difference in wall voltage between sustain electrode SU1 and scan electrode SC1 to difference voltage applied from outside (i.e., Ve2−Va). Setting voltage Ve2 to a value just below the discharge-start voltage brings a "discharge-prone" condition between sustain electrode SU1 and scan electrode SC1. Under the condition, the discharge generated between data electrode Dk and scan electrode SC1 triggers discharge between sustain electrode SU1 (disposed in a crossing area to data electrode Dk) and scan electrode SC1. In this way, an address discharge occurs in a discharge cell to be lit. Through the address discharge, positive wall voltage is built up on scan electrode SC1 and negative wall voltage is built up on sustain electrode SU1 and data electrode Dk.

In an address operation, as described above, an address discharge is generated so as to build up wall voltage on each electrode in the discharge cell to be lit at the first row. On the other hand, the voltage at the intersection of scan electrode SC1 and the data electrodes which do not applied address pulse voltage Vd, is lower than the discharge-start voltage and therefore no address discharge. After the address operation is repeatedly carried out until the discharge cells located in the $n^{th}$ row, the address period is completed.

In the sustain period that follows the address period, positive sustain pulse voltage Vs is applied to scan electrodes SC1-SCn, and at the same time, voltage of zero (0V) (i.e., ground potential as base potential) is applied to sustain electrodes SU1-SUn. In the discharge cell where an address discharge occurred in the previous period, difference in voltage between scan electrode SCi and sustain electrode SUi is calculated by adding sustain pulse voltage Vs to the difference between the wall voltage on scan electrode SCi and the wall voltage on sustain electrode SUi. The calculated value exceeds the discharge-start voltage, thereby generating a sustain discharge between scan electrode SCi and sustain electrode SUi.

The sustain discharge produces ultraviolet light, allowing phosphor layer 35 to emit light. Negative wall voltage is built up on scan electrode SCi and positive wall voltage is built up on sustain electrode SUi and data electrode Dk. A discharge cell without an address discharge in the previous address period has no sustain discharge and therefore maintains the wall voltage the same as that at the end of the initializing period.

Next, voltage of zero (0V) as base potential is applied to scan electrodes SC1-SCn and sustain pulse voltage Vs is applied to sustain electrodes SU1-SUn. In the discharge cell where a sustain discharge occurred, difference in voltage between sustain electrode SUi and scan electrode SCi exceeds the discharge-start voltage, thereby generating a sustain discharge again between sustain electrode SUi and scan electrode SCi. Through the discharge, negative wall voltage is built up on sustain electrode SUi and positive wall voltage is built up on scan electrode SCi. In this way, scan electrodes SC1-SCn and sustain electrodes SU1-SUn alternately undergo sustain pulses, where the number of the pulses to be applied are determined by multiplying a luminance weight by a luminance factor, providing difference in voltage between the scan electrodes and the sustain electrodes of display electrode pairs 24. This allows the sustain discharge to repeatedly occur in a discharge cell where an address discharge occurred in the address period.

At the end of the sustain period, as shown in FIG. 4, a narrow-width pulse voltage is applied to scan electrodes SC1-SCn and sustain electrodes SU1-SUn. The applied voltage weakens wall voltage on scan electrode SCi and sustain electrode SUi, with the positive wall voltage on data electrode Dk maintained.

That is, after the voltage of sustain electrodes SU1-SUn is set to 0V, the voltage of scan electrodes SC1-SCn and sustain electrodes SU1-SUn is clamped to 0V for a period (hereinafter referred to as base-potential period ThG). After that, sustain pulse voltage Vs is applied to scan electrodes SC1-SCn.

The applied voltage causes a weak discharge between sustain electrode SUi and scan electrode SCi in the cell where a sustain discharge occurred. In an ending stage of the discharge, i.e., in a period where the discharge space still retains sufficient amount of charged particle generated by the discharge, voltage Ve1 is applied to sustain electrodes SU1-SUn. This weakens the difference in voltage between sustain electrode SUi and scan electrode SCi to a level of around (Vs−Ve1), and accordingly, the wall charges between scan electrodes SC1-SCn and sustain electrodes SU1-SUn are weakened to a level of around (Vs−Ve1), with positive wall charges on data electrode Dk maintained. Hereinafter, the discharge is referred to as an erase discharge. To generate the erase discharge, voltage difference with a narrow-width pulse is applied between the electrodes of display electrode pairs 24, i.e., between the scan electrodes SC1-SCn and sustain electrodes SU1-SUn.

In the end of a sustain period, after voltage Vs for generating the erase discharge as the last sustain voltage is applied to scan electrodes SC1-SCn, a predetermined time interval (hereinafter, erase phase-difference Th1) is provided. After a lapse of erase phase-difference Th1, voltage Ve1 is applied to sustain electrodes SU1-SUn for easing the difference in voltage between display electrode pairs 24. The sustain operation in the sustain period of 1SF thus completes.

In the structure of the embodiment, the timing of generating the erase discharge in the end of the sustain period is determined according to the length of the cumulative current-carrying time of panel 10. The cumulative current-carrying time is calculated by the cumulative time calculating circuit. Specifically, as shown in FIG. 4, just before applying the sustain pulse voltage to scan electrodes SC1-SCn, the voltage of display electrode pairs 24 is clamped to ground potential as base potential for base-potential period ThG at the end of the sustain period. The length of base-potential period ThG is changed according to the cumulative current-carrying time of panel 10 calculated by the cumulative time calculating circuit. Detailed descriptions thereof will be given later. The structure above allows a panel (even it is a panel with high luminance) to have stable address discharges with no need for increasing address pulse voltage Vd to cope with increase in the cumulative current-carrying time of the panel.

Next will be described the workings of 2SF as a selective-cell initializing sub-field.

In the selective-cell initializing operation of the initializing period in 2SF, voltage Ve1 is applied to sustain electrodes SU1-SUn and the voltage of zero (0V) is applied to data electrodes D1-Dm. With the condition above maintained, falling-ramp voltage gradually decreasing from voltage Vi3' toward voltage Vi4 is applied to scan electrodes SC1-SCn.

During the voltage is applied to scan electrodes SC1-SCn, a weak initializing discharge occurs in a discharge cell where a sustain discharge occurred in the sustain period in the previous sub-field. The discharge weakens wall voltage on scan electrode SCi and sustain electrode SUi. A sufficient amount of positive wall voltage is built up on electrode Dk. An excessive amount of the wall voltage is discharged, so that a proper amount of wall voltage is left for the address operation.

On the other hand, a discharge cell without a sustain discharge in the previous sub-field has no initializing discharge and therefore maintains the wall voltage the same as that at the end of the initializing period of the previous sub-field. As described above, the selective-cell initializing operation is carried out selectively on a discharge cell where the sustain operation occurred in the sustain period of the previous sub-field.

The operations of address period of the selective-cell initializing sub-field are similar to those of the all-cell initializing sub-field and descriptions thereof will be omitted. The operations of the sustain period that follows the address period are also similar to those of the all-cell initializing sub-field except for the number of sustain pulses. The operations carried out in the initializing period in 3SF through 10SF are the selective-cell initializing operation similar to that of 2SF. The operations of the address period and the sustain period in 3SF through 10SF are similar, except for the number of sustain pulses, to that of 2SF.

Next will be described on difference in waveforms of driving voltage according to the length of the cumulative current-carrying time of a panel, with reference to FIG. 5.

FIG. 5 shows correspondence between the cumulative current-carrying time of a panel and base-potential period ThG in accordance with the embodiment.

The structure of the embodiment employs two values for base-potential period ThG so as to switch between the two values by judgment of the cumulative time calculating circuit. The calculating circuit judges whether the cumulative current-carrying time of panel 10 is greater than a predetermined period or not.

Specifically, when the cumulative current-carrying time of panel 10 is judged as being not greater than a predetermined period (here in the embodiment, not greater than 500 hours) by the cumulative time calculating circuit, base-potential period ThG is set to 0 nsec. When the cumulative current-carrying time is judged as being greater than the predetermined period (i.e., greater than 500 hours in the embodiment), base-potential period ThG is set to 500 nsec.

According to the structure of the embodiment, as described above, after the cumulative current-carrying time of panel 10 exceeds a predetermined period, base-potential period ThG has a value greater than before. This allows a panel to have a stable address discharge. The reason will be explained below.

Discharge characteristics vary as the length of the cumulative current-carrying time of panel 10. Similarly, discharge-destabilizing factors, such as discharge delay and dark current, also depend on the length of the cumulative current-carrying time of panel 10 (where, the discharge delay means a time lag between the time at which voltage is applied to a discharge cell for generating discharge and the time at which discharge actually occurs, and the dark current is a current generated in a discharge cell with no regard to discharge). That is, voltage required for generating a stable address discharge also varies as the length of the cumulative current-carrying time of panel 10.

Figure 6:
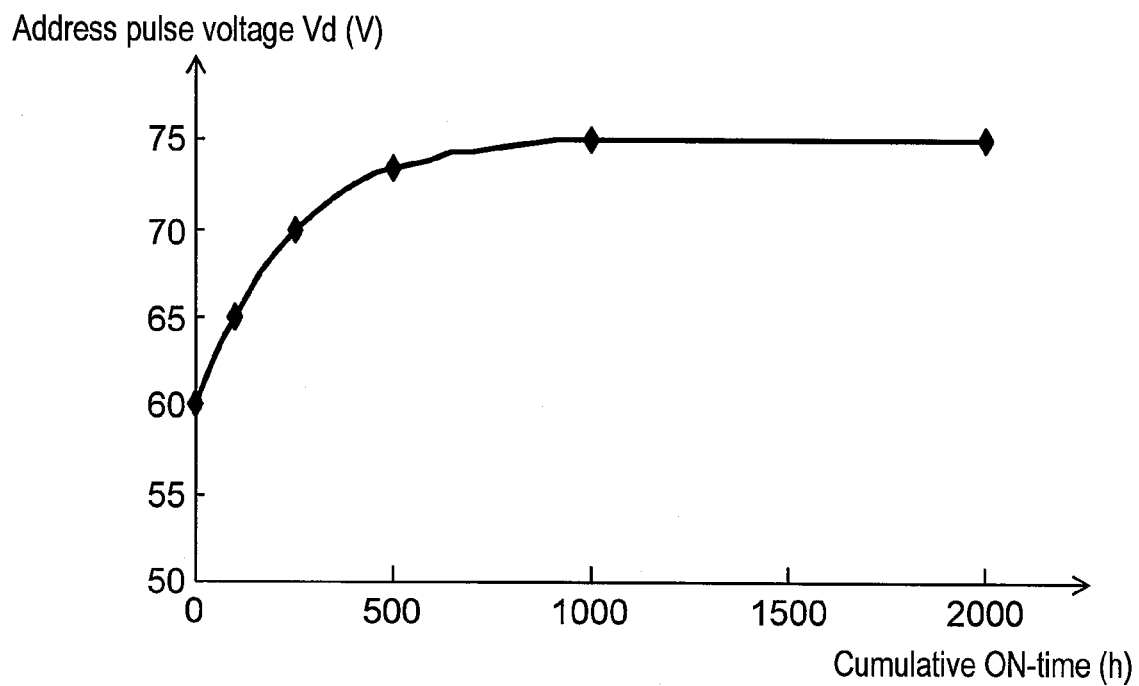
FIG. 6 is a graph showing the relationship between the cumulative current-carrying time of a panel and address pulse voltage Vd required for generating a stable address discharge of the embodiment.

FIG. 6 shows the relationship between the cumulative current-carrying time of a panel and address pulse voltage Vd required for generating a stable address discharge of the embodiment. In the graph, the vertical axis represents address pulse voltage Vd required for a stable address discharge, and the horizontal axis represents the cumulative current-carrying time of panel 10.

It is apparent from FIG. 6 that address pulse voltage Vd required for generating a stable address discharge gets higher as the cumulative current-carrying time of panel 10 increases. For example, under the early stage where the cumulative current-carrying time takes about 0 h, address pulse voltage Vd takes 60V. When the cumulative current-carrying time reaches about 500 h, however, address pulse voltage Vd increases by 13V and reaches 73V. After the cumulative current-carrying time exceeds 1000 h, address pulse voltage Vd is kept at around 75V.

An erase discharge with narrow-width pulses, as described above, changes the electric field of the discharge space under the condition where the discharge space still retains sufficient amount of charged particle and rearranges the charged particles to ease the change occurred in the electric field so that a desired amount of wall charges is formed. It is proved that the discharge intensity of the erase discharge varies as the length of base-potential period ThG. This is probably because the condition of the wall charges generated by the sustain discharge just before the erase discharge varies as the length of base-potential period ThG. It is also proved that an applied voltage required for the following address discharge varies as the length of base-potential period ThG. The relationship between them will be described below.

Figure 7:
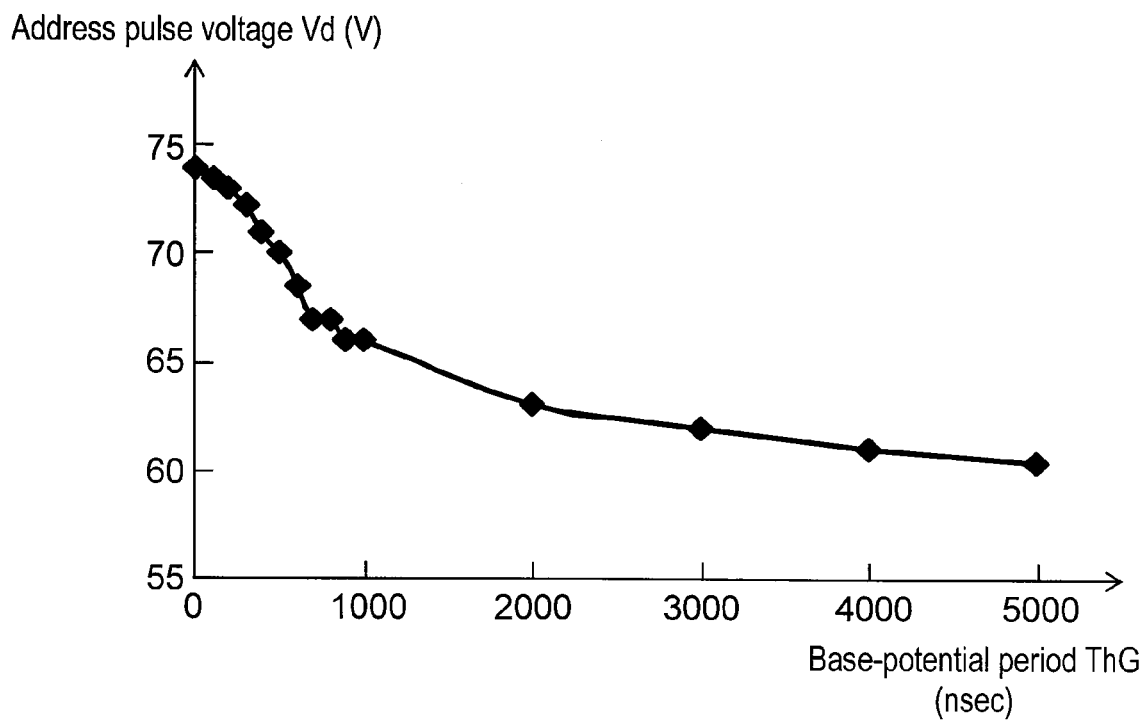
FIG. 7 is a graph showing the relationship between base-potential period ThG and address pulse voltage Vd required for generating a stable address discharge of the embodiment.

FIG. 7 is a graph showing the relationship between base-potential period ThG and address pulse voltage Vd required for generating a stable address discharge of the embodiment. The vertical axis of the graph represents address pulse voltage Vd required for generating a stable address discharge. The horizontal axis represents base-potential period ThG.

As shown in FIG. 7, address pulse voltage Vd required for generating a stable address discharge varies as the length of base-potential period ThG. Address pulse voltage Vd gets lower as base-potential period ThG increases. For example, when base-potential period ThG takes about 0 nsec, address pulse voltage Vd takes approx. 74V. When base-potential period ThG is set to 500 nsec, however, address pulse voltage Vd lowers to 68V with a decrease of about 6V.

That is, increase in the cumulative current-carrying time allows address pulse voltage Vd to get higher, on the other hand, increase in base-potential period ThG allows address pulse voltage Vd to get lower. Considering this, changing the length of base-potential period ThG according to the length of the cumulative current-carrying time suppresses the increase in voltage Vd caused by an increased cumulative current-carrying time, thereby generating a stable address discharge without increase in address pulse voltage Vd.

According to the structure of the embodiment, the cumulative time calculating circuit, to be described later, judges whether the cumulative current-carrying time of panel 10 exceeds a predetermined period or not. When the cumulative current-carrying time stays below the predetermined period (here in the embodiment, not greater than 500 h), base-potential period ThG is set to about 0 nsec. After the cumulative current-carrying time exceeds the predetermined period, i.e., exceeds 500 h in the embodiment, base-potential period ThG is set to 500 nsec. Switching the setting of base-potential period ThG between the two values above allows the panel to have a stable address discharge with no need for increasing address pulse voltage Vd required for generating a stable address discharge.

On the other hand, increase in base-potential period ThG allows voltage Ve2 required for address operation to get higher, in contrast to the behavior of address pulse voltage Vd.

Figure 8:
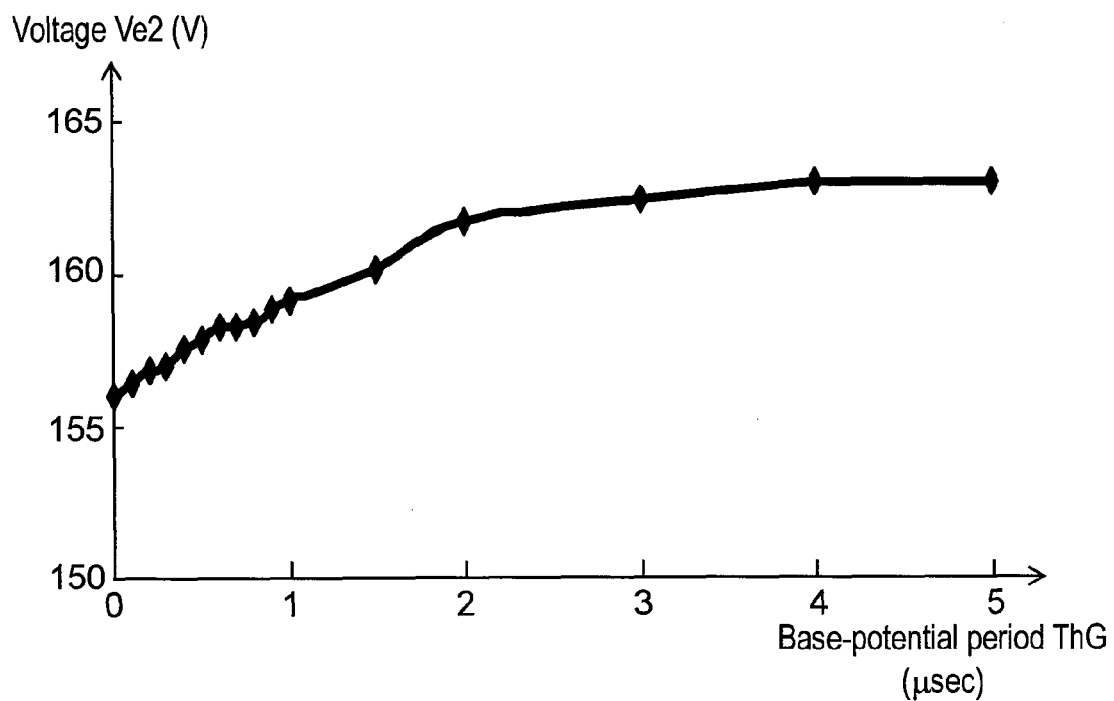
FIG. 8 is a graph showing the relationship between base-potential period ThG and voltage Ve2 required for generating a stable address discharge of the embodiment.

FIG. 8 is a graph showing the relationship between base-potential period ThG and voltage Ve2 required for generating a stable address discharge of the embodiment. The vertical axis of the graph represents voltage Ve2 required for generating a stable address discharge. The horizontal axis represents base-potential period ThG. It is apparent from FIG. 8 that voltage Ve2 required for generating a stable address discharge varies as the length of base-potential period ThG. For example, when base-potential period ThG takes about 0 nsec, voltage Ve2 takes about 156V. When base-potential period ThG is set to 500 nsec, however, voltage Ve2 gets higher to about 158V with an increase of about 2V.

Figure 9:
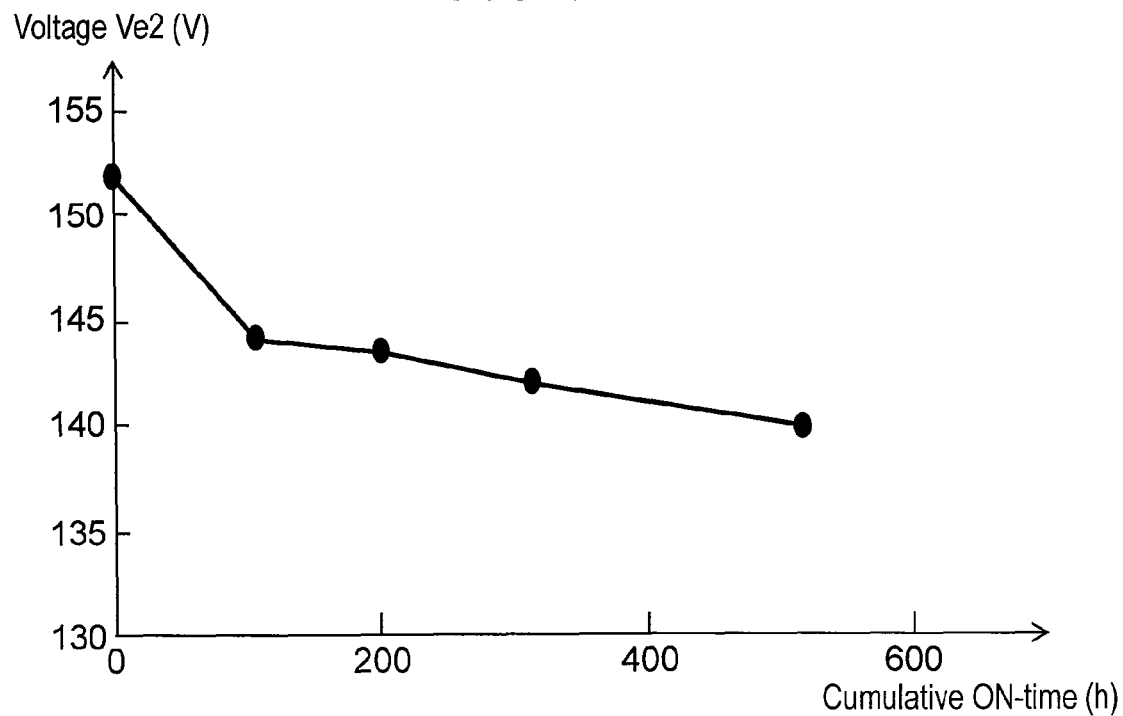
FIG. 9 is a graph showing the relationship between the cumulative current-carrying time of a panel and voltage Ve2 required for generating a stable address discharge of the embodiment.

On the other hand, it has been proved that increase in the cumulative current-carrying time allows voltage Ve2 required for address operation to get lower, in contrast to the behavior of address pulse voltage Vd. FIG. 9 is a graph showing the relationship between the cumulative current-carrying time of a panel and voltage Ve2 required for generating a stable address discharge of the embodiment. The vertical axis of the graph represents voltage Ve2 required for generating a stable address discharge. The horizontal axis represents the cumulative current-carrying time of panel 10. It is apparent from FIG. 9 that voltage Ve2 required for generating a stable address discharge gets lower as the cumulative current-carrying time of panel 10 increases. For example, under the early stage where the cumulative current-carrying time takes about 0 h, voltage Ve2 takes 152V. When the cumulative current-carrying time reaches about 500 h, however, voltage Ve2 goes down to 140V with a decrease of about 12V.

To maintain a proper level of voltage Ve2, it is preferable that base-potential period ThG should be minimized when the cumulative current-carrying time stays below a predetermined period. After the cumulative current-carrying time exceeds the predetermined period, increase in base-potential period ThG has no perceptible influence on voltage Ve2.

An excessive increase in base-potential period ThG invites a poor erase discharge, resulting in failure in forming a desirable amount of wall charges due to lack of charged particles for easing the electric field of the discharge space. The lack of wall charges causes address-operation failure in which an address discharge is not generated when it should be. Considering above, the setting of base-potential period ThG is switched between the lengths of 0 nsec and 500 nsec in the embodiment.

The aforementioned values are determined by an experiment using a 50-inch panel with 1080 display electrode pairs. They are cited merely by way of example and without limitation in the embodiment.

Figure 10:
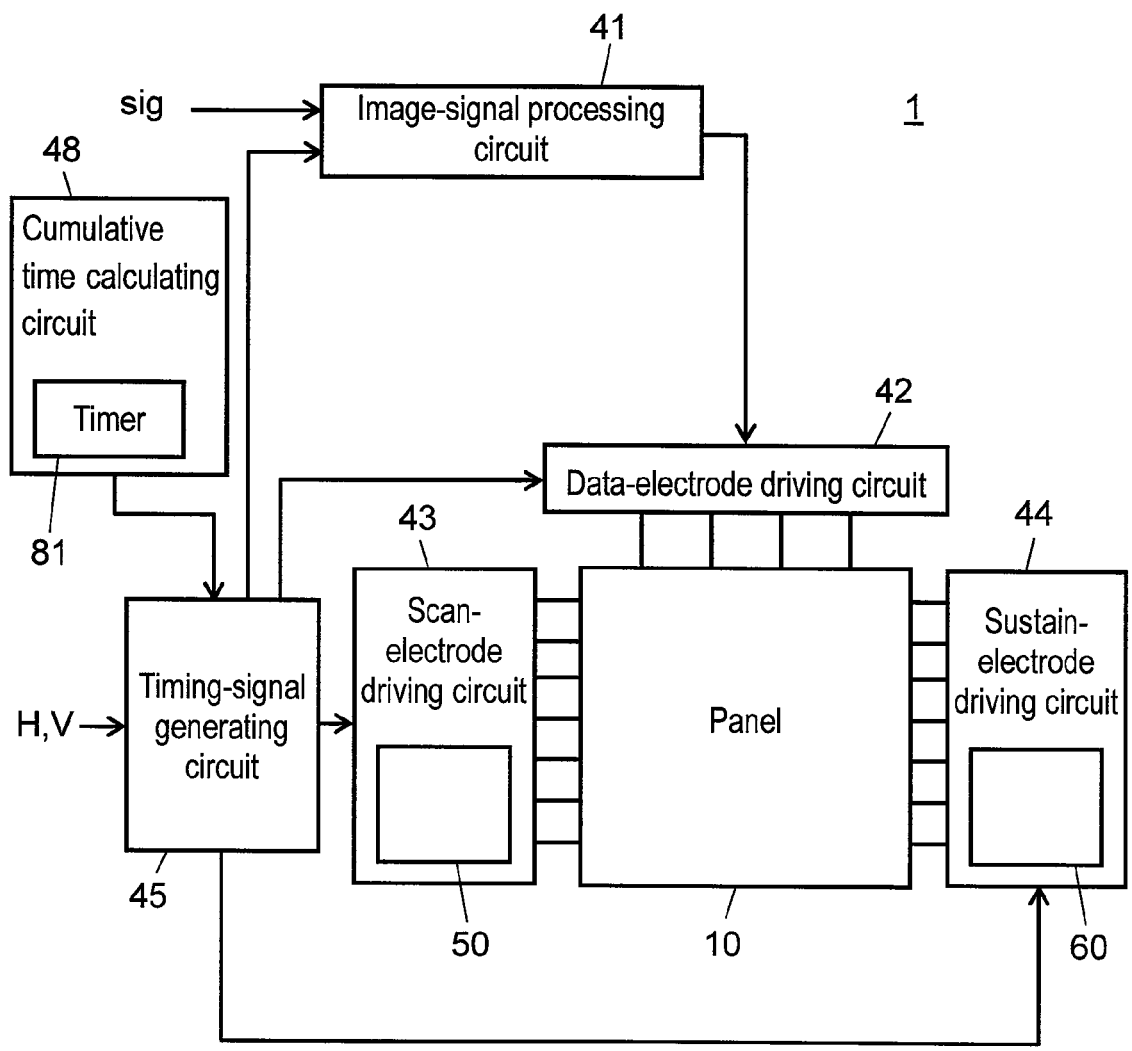
FIG. 10 is a circuit block diagram of the plasma display device of the embodiment.

Next will be described the structure of the plasma display device of an embodiment. FIG. 10 is a circuit block diagram of the plasma display device of the embodiment. The plasma display device of the embodiment has panel 10 having a plurality of discharge cells each of which includes a display electrode pair formed of a scan electrode and a sustain electrode, cumulative time calculating circuit 48 for calculating the cumulative current-carrying time of panel 10, and a driving circuit for driving panel 10. The driving circuit contains image-signal processing circuit 41, data-electrode driving circuit 42, scan-electrode driving circuit 43, sustain-electrode driving circuit 44, timing-signal generating circuit 45, and a power supply circuit (not shown) for supplying power to each circuit block.

Receiving image signal 'sig', image-signal processing circuit 41 converts it into image data for light-emitting or non-light-emitting on a sub-field basis. Data-electrode driving circuit 42 converts the image data of each sub-field into a signal for data electrodes D1-Dm to drive them.

Cumulative time calculating circuit 48 has timer 81 that is generally known as a device for measuring cumulative time by adding an increment by unit time. While panel 10 is carrying current, timer 81 measures the cumulative time without resetting to calculate the cumulative current-carrying time of panel 10. Cumulative time calculating circuit 48 has a threshold and compares the cumulative current-carrying time calculated by timer 81 with the threshold for judging whether cumulative current-carrying time exceeds the threshold or not. Cumulative time calculating circuit 48 outputs a signal having the judgment result to timing-signal generating circuit 45.

Although the threshold is set to 500 h in the embodiment, it is not limited thereto. It should be properly determined according to characteristics of a panel and specifications of a plasma display device.

Timing-signal generating circuit 45 generates timing signals that control each circuit block according to a horizontal synchronizing signal H, a vertical synchronizing signal V and the cumulative current-carrying time of panel 10 calculated by cumulative time calculating circuit 48, and the timing signals are fed to each circuit block. In the embodiment, as described above, the setting of base-potential period ThG is determined according to the cumulative current-carrying time, and accordingly, timing-signal generating circuit 45 outputs a timing signal corresponding to the setting to sustain-electrode driving circuit 44. Through the process above, a stable address operation is obtained.

Scan-electrode driving circuit 43 has an initializing-waveform generating circuit (not shown), sustain-pulse generating circuit 50 and an scan-pulse generating circuit (not shown). The initializing-waveform generating circuit generates voltage with an initializing waveform to be applied to scan electrodes SC1-SCn in the initializing period. Sustain-pulse generating circuit 50 generates sustain pulse voltage to be applied to scan electrodes SC1-SCn in the sustain period. The scan-pulse generating circuit generates scan pulse voltage to be applied to scan electrodes SC1-SCn in the address period. Such structured scan-electrode driving circuit 43 drives scan electrodes SC1-SCn according to a timing signal. Sustain-electrode driving circuit 44 has sustain-pulse generating circuit 60 and a circuit for generating voltage Ve1 and voltage Ve2. Sustain-electrode driving circuit 44 drives sustain electrodes SU1-SUn according to a timing signal.

Figure 11:
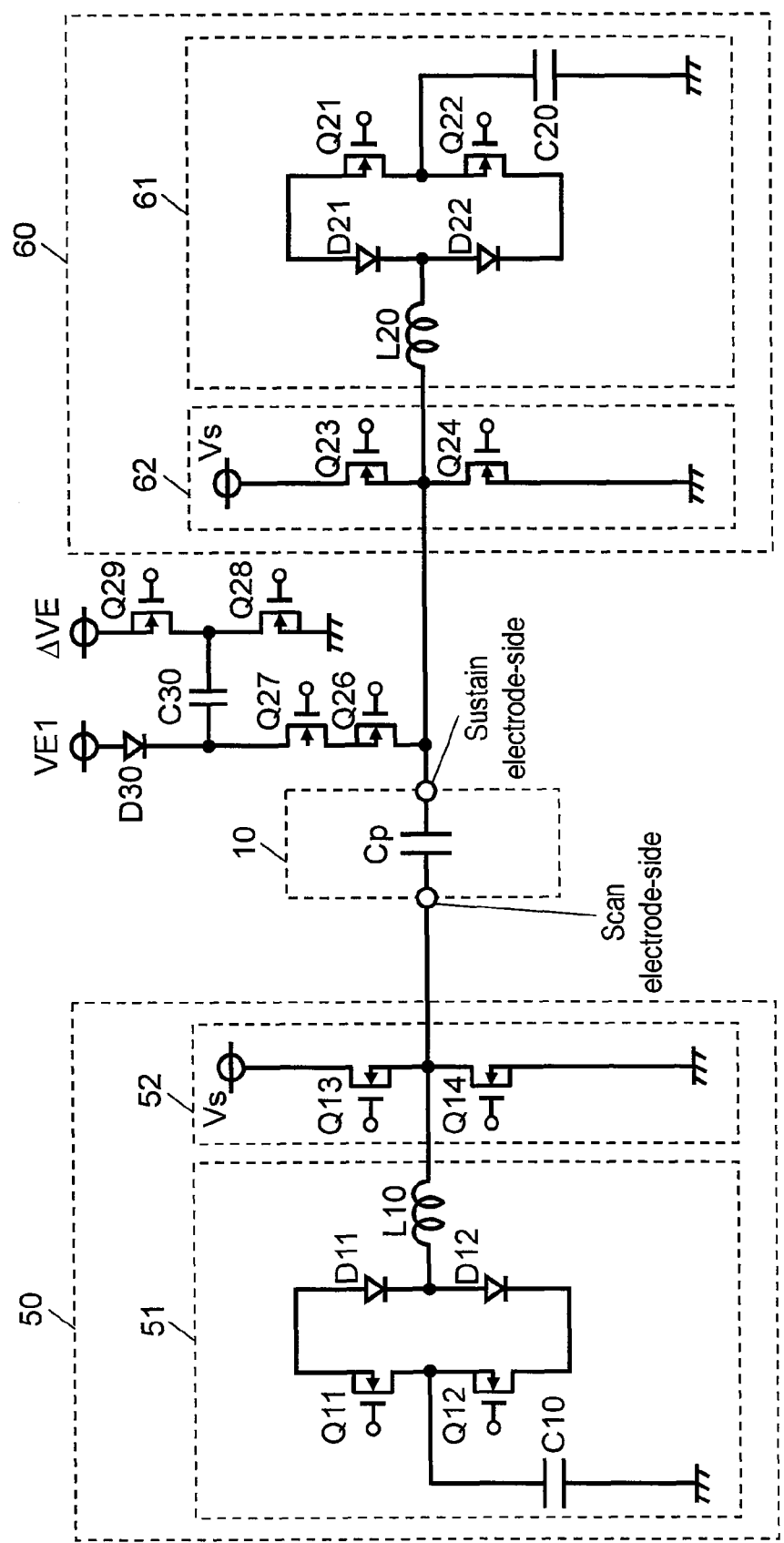
FIG. 11 is a circuit diagram of the sustain-pulse generating circuit of the embodiment.

Next will be given a detailed description on sustain-pulse generating circuits 50 and 60 and the workings of them. FIG. 11 is a circuit diagram of sustain-pulse generating circuits 50 and 60 of the embodiment. FIG. 11 shows the inter-electrode capacitor of panel 10 as Cp. The scan-pulse generating circuit and the initializing-waveform generating circuit are not shown in FIG. 11.

Sustain-pulse generating circuit 50 has power-recovery circuit 51 and clamping circuit 52. Circuits 51 and 52 are connected to one end of inter-electrode capacitor Cp of panel 10, i.e., scan electrodes SC1-SCn via the scan-pulse generating circuit (not shown because it is kept in a short-circuited condition during the sustain period).

Power-recovery circuit 51 has capacitor C10 for collecting power, switching elements Q11 and Q12, diodes D11 and D12 for preventing reverse flow and resonance inductor L10. Rise and decay of sustain pulses are obtained by LC resonance of inter-electrode capacitor Cp and inductor L10 of power-recovery circuit 51. With no supplying of power from a power supply, power-recovery circuit 51 drives scan electrodes SC1-SCn by LC resonance. That is, in theory, power-recovery circuit 51 drives the electrodes with no power consumption. Having a capacitance sufficiently larger than that of inter-electrode capacitor Cp, capacitor C10 has been half-charged of sustain-pulse voltage Vs so as to serve as the power supply for power-recovery circuit 51.

Clamping circuit 52 has switching elements Q13 and Q14 for clamping the voltage of scan electrodes SC1-SCn to voltage Vs and 0V, respectively. Through the operation of switching element Q13, scan electrodes SC1-SCn are connected to power supply VS, i.e., clamped to voltage Vs. Similarly, through the operation of switching element Q14, scan electrodes SC1-SCn are connected to ground, i.e., clamped to 0V. Therefore, clamping circuit 52 has a small impedance at the application of voltage, by which large current caused by a strong sustain discharge flows with stability.

Receiving a timing signal from timing-signal generating circuit 45, sustain-pulse generating circuit 50 effects on/off control of switching elements Q11, Q12, Q13 and Q14 so as to operate power-recovery circuit 51 and clamping circuit 52, by which sustain pulse voltage Vs is generated. Detailed description thereof will be given later. These switching elements are formed of generally well-known devices, such as MOSFETs and IGBTs.

Sustain-pulse generator 60, which has power-recovery circuit 61 and clamping circuit 62, is connected to one end of inter-electrode capacitor Cp of panel 10, i.e., connected to sustain electrodes SU1-SUn. Power-recovery circuit 61 contains capacitor C20 for collecting power, switching elements Q21 and Q22, diodes D21 and D22 for preventing reverse flow and resonance inductor L20. Clamping circuit 62 contains switching elements Q23 and Q24 for clamping the voltage of sustain electrodes SU1-SUn to voltage Vs and ground potential, respectively. Sustain-pulse generating circuit 60 works similar to sustain-pulse generating circuit 50, and description thereof will be omitted.

FIG. 11 shows power supply VE1 for generating voltage Ve1, switching elements Q26 and Q27 for applying voltage Ve1 to sustain electrodes SU1-SUn, power supply ΔVE for generating voltage ΔVe, diode D30 for preventing reverse flow, capacitor C30, and switching elements Q28 and Q29 for adding voltage ΔVe onto voltage Ve1 to obtain voltage Ve2. In FIG. 3, for example, to apply voltage Ve1 to the sustain electrodes, switching elements Q26, Q27 are switched on. Switching them on allows sustain electrodes SU1-SUn to apply of positive voltage Ve1 via diode D30 and switching elements Q26, Q27. For applying the voltage Ve1, switching element Q28 is turned on so that capacitor C30 is charged to voltage Ve1. To apply voltage Ve2 to the sustain electrodes, switching element Q29 is switched on and switching element Q28 is switched off, with switching elements Q26 and Q27 remained on. Through the switching operation above, voltage ΔVe is added onto the voltage of capacitor C30 so that voltage Ve1+ΔVe, i.e., voltage Ve2 is applied to sustain electrodes SU1-SUn. At that timing of application, diode D30 prevents reverse flow of current from capacitor 30 to power supply VE1.

The circuit used for applying voltage Ve1 and voltage Ve2 does not necessarily to have the structure shown in FIG. 11. For example, the circuit may contain different power supplies (one is for applying voltage Ve1, and the other is for voltage Ve2) and a plurality of switching elements dedicated to each applying the voltage. In this case, each voltage is applied to sustain electrodes SU1-SUn with a proper timing.

The LC-resonance frequency of inductor L10 of power-recovery circuit 51 and inter-electrode capacitor Cp of panel 10 and the LC-resonance frequency (hereinafter, resonance frequency) of inductor L20 of power-recovery circuit 61 and inter-electrode capacitor Cp are obtained by the expression: $2\pi(LCp)^{1/2}$, where, L represents each inductance of inductors L10 and L20. According to the embodiment, the inductance of inductors L10 and L20 is determined so that the resonance frequency of power-recovery circuits 51 and 61 takes approx. 1100 nsec. The value is cited merely by way of example and without limitation. It should be set to an optimum value suitable for characteristics of a panel and specifications of a plasma display panel.

Figure 12:
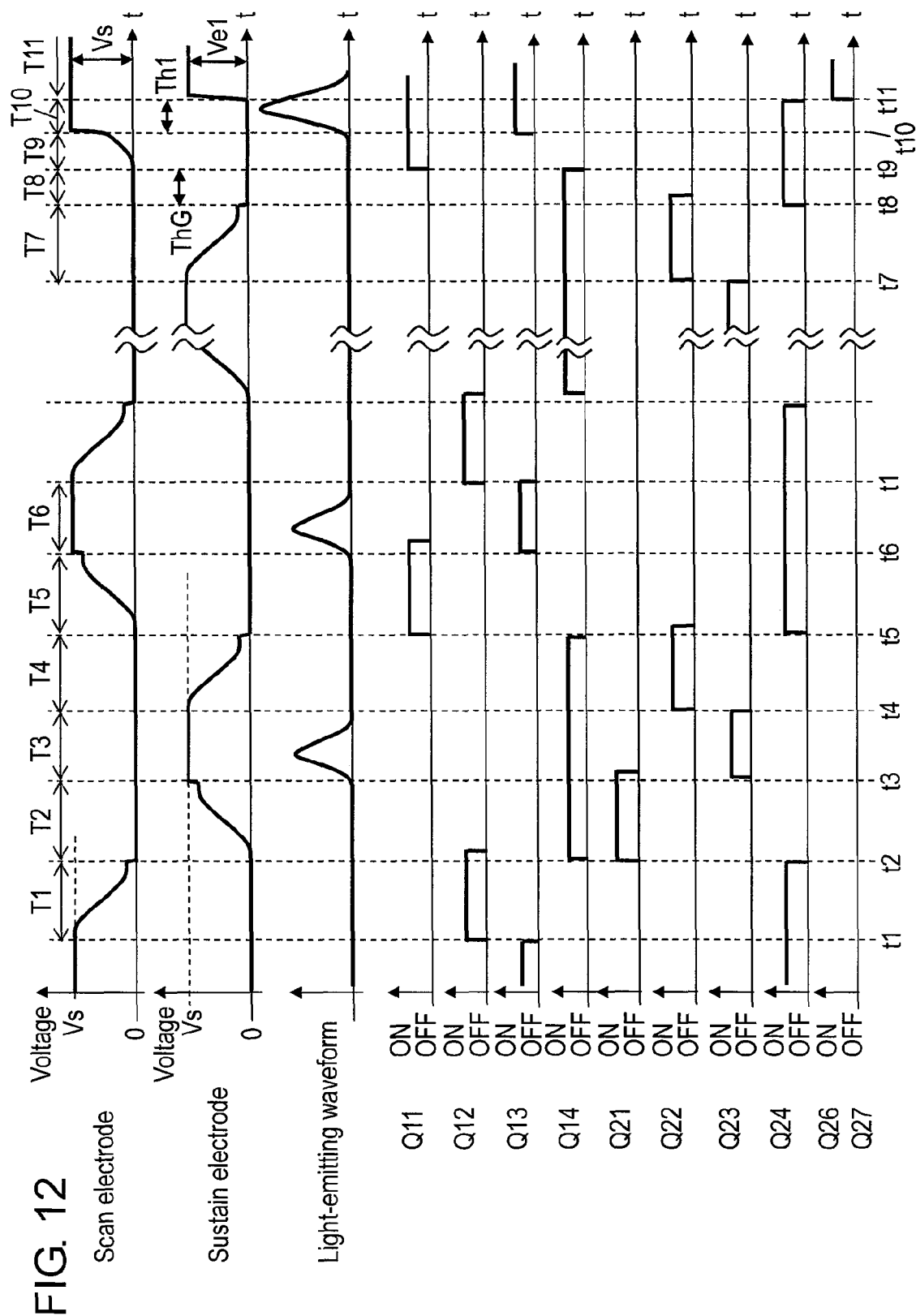
FIG. 12 is a timing chart illustrating the workings of the sustain-pulse generating circuit of the embodiment.

Next will be given a detailed description on waveforms of driving voltage applied in a sustain period. FIG. 12 is a timing chart illustrating the workings of sustain-pulse generating circuits 50 and 60 in accordance with an embodiment. It shows a detail of the part surrounded by dotted lines in FIG. 3. In the figure, one cycle of sustain pulses is divided into 6 periods: period T1 through period T6. Hereinafter, the description will be given on each period.

The description will be given on the understanding that the operation for bringing a switching element into conduction is represented by turning ON a switching element, and the operation for bringing a switching element out of conduction is represented by turning OFF a switching element. Accordingly, FIG. 12 shows the signal for turning ON a switching element as the ON signal, and shows the signal for turning OFF switching element as the OFF signal.

[Period T1]

At time t1, switching element Q12 is turned ON. The operation allows the electric charges on the side of scan electrodes SC1-SCn to move to capacitor C10 via inductor L10, diode D12 and switching element Q12, by which the voltage of scan electrodes SC1-SCn starts to decrease. Inductor L10 and inter-electrode capacitor Cp form a resonance circuit. As of time t2, i.e., after lapse of half the resonance frequency, the voltage of scan electrodes SC1-SCn has fallen around 0V, but keeps just higher than 0V due to power loss caused by resistance component of the resonance circuit. During period T1, switching element Q24 is kept ON.

[Period T2]

At time t2, switching elements Q14 and Q21 are turned ON. First, turning ON switching element Q14 allows scan electrodes SC1-SCn to directly connect to ground, which forces to decrease the voltage of scan electrodes SC1-SCn to 0V.

Turning ON switching element Q21 at time t2 allows current to flow from capacitor C20 via switching element Q21, diode D21 and inductor L20, by which the voltage of sustain electrodes SU1-SUn starts to increase. Inductor L20 and inter-electrode capacitor Cp form a resonance circuit. As of time t3, i.e., after lapse of half the resonance frequency, the voltage of sustain electrodes SU1-SUn has raised around 0V, but keeps just lower than voltage Vs due to power loss caused by resistance component of the resonance circuit.

[Period T3]

At time t3, switching element Q23 is turned ON. Turning ON the switching element allows sustain electrodes SU1-SUn to be directly connected to power supply VS, which forces to increase the voltage of sustain SU1-SUn up to voltage Vs. At this time, in a discharge cell where an address discharge has been generated, the voltage between scan electrode SCi and sustain electrode SUi exceeds a discharge-start voltage, allowing the cell to have a sustain discharge.

[Period T4 through Period T6]

The sustain pulse to be applied to scan electrodes SC1-SCn has a waveform the same as that applied to sustain electrodes SU1-SUn. Besides, change in voltage of scan electrodes SC1-SCn from period T4 through period T6 corresponds to that of sustain electrodes SU1-SUn from period T1 through period T3. Therefore, description here will be omitted.

Turn-off timing of each switching element is as follows:
  switching element Q12 is turned OFF at a time after time t2 and by time t5 at the latest;
  switching element Q21 is turned OFF at a time after time t3 and by time t4 at the latest;
  switching element Q22 is turned OFF at a time after time t5 and by time t2 in the next cycle at the latest;
  switching element Q11 is turned OFF at a time after time t6 and by time t1 in the next cycle at the latest;
  switching element Q13 is preferably turned OFF just moments before time t1 to decrease output impedance of sustain-pulse generating circuit 50;
  switching element Q24 is preferably turned OFF just moments before time t2 to decrease output impedance of sustain-pulse generating circuit 60;
  switching element Q14 is preferably turned OFF just moments before time t5; and
  switching element Q23 is preferably turned OFF just moments before time t4.

The switching operations described in period T1 through period T6 are repeated according to the required number of sustain pulses during a sustain period. In this way, the sustain-pulse voltage is applied to each electrode of display electrode pairs 24 alternately, where the sustain-pulse voltage varies from 0V as the base potential to voltage Vs as the potential for generating a sustain discharge, by which a sustain discharge occurs in a discharge cell.

Next will be given a detailed description on an erase discharge generated at the end of a sustain period. In the description below, the ending stage of a sustain period is divided into 5 periods: period T7 through period T11.

[Period T7]

Like period T4, this period corresponds to the pulse decay time of the sustain pulse applied to sustain electrodes SU1-SUn. Switching element Q23 is turned OFF just before time t7 and switching element Q22 is turned ON at time t7. The switching operation allows the electric charges on the side of sustain electrodes SU1-SUn to start to flow into capacitor C20 via inductor L20, diode D22 and switching element Q22. Accordingly, the voltage of sustain electrodes SU1-SUn starts to decrease.

[Period T8]

At time t8, switching element Q24 is turned ON, which forces to decrease the voltage of sustain electrodes SU1-SUn to 0V. As switching element Q14 stays ON like in period T7, the voltage of display electrode pairs 24, i.e., of scan electrodes SC1-SCn and sustain electrodes SU1-SUn is maintained at 0V as the base potential.

As described above, display electrode pairs 24 are clamped to 0V as the base potential for a period between the sustain pulse for generating the last sustain discharge and the immediately preceding sustain pulse. The aforementioned period during which the voltage of display electrode pairs 24 is clamped to 0V is defined as base-potential period ThG.

[Period T9]

Switching element Q14 is turned OFF just before time t9 and switching element Q11 is turned ON at time t9. The switching operation allows current to start to flow from capacitor C10 as a power collector via switching element Q11, diode D11 and inductor L10. Accordingly, the voltage of scan electrodes SC1-SCn starts to increase.

Base-potential period ThG is a time interval between the moment at which switching element Q24 is turned ON to clamp the voltage of sustain electrodes SU1-SUn to 0V and the moment at which switching element Q11 is turned ON so that electric power is delivered to scan electrodes SC1-SCn from capacitor C10 as a power collector. According to the embodiment, base-potential period ThG is switched between 0 nsec and 500 nsec so as to be appropriate to the cumulative current-carrying time of panel 10 calculated by cumulative time calculating circuit 48. In the switching operations above, however, a time lag inevitably occurs between the moment at which a switching element receives a control signal and the moment at which the switching element actually response to the signal. Considering this, base-potential period ThG may be defined as the time interval between the moments of control-signal input to the switching elements, i.e., between time t8 and time t9.

[Period T10]

Inductor L10 and inter-electrode capacitor Cp form a resonance circuit. By the time half the resonance frequency lapses, the voltage of scan electrodes SC1-SCn has increased close to voltage Vs. In the meantime, switching element Q13 is turned ON at time t10, which is a time shorter than the half the resonance frequency of the power-recovery circuit and just before the voltage of the scan electrodes has the increase close to voltage Vs. Turning ON switching element Q13 allows scan electrodes SC1-SCn to be directly connected to power supply VS. Accordingly, the voltage of scan electrodes SC1-SCn has a sharp increase to voltage Vs, generating the last sustain discharge.

[Period T11]

Switching element Q24 is turned OFF just before time t11 and switching elements Q26 and Q27 are turned ON at time t11. The switching operation allows sustain electrodes SU1-SUn to be directly connected to power supply VE1 for generating an erase discharge, which forces to increase the voltage of sustain electrodes SU1-SUn to voltage Ve1. Time t11 corresponds to a stage before ending of the discharge generated in period T10 and therefore the discharge space has still a sufficient amount of charged particles caused by the discharge. Under the condition, the electric field in the discharge space changes. The charged particles in the discharge space, which keeps an adequate amount therein, undergo rearrangement to ease the change in the electric field and form wall charge.

Applying voltage Ve1 to sustain electrodes SU1-SUn decreases difference in voltages between scan electrodes SC1-SCn and sustain electrodes SU1-SUn, which weakens wall voltage on scan electrodes SC1-SCn and on sustain electrodes SU1-SUn. The finally generated sustain discharge is an erase discharge, which is caused by a voltage difference in the form of a narrow-width pulse applied so as to ease the voltage difference between display electrode pairs 24 before the last sustain discharge is over. On the other hand, the voltage of data electrodes D1-Dm (not shown in FIG. 12) is maintained at 0V. The charged particles generated by the sustain discharge form wall charges so as to ease difference in voltage between data electrodes D1-Dm and scan electrodes SC1-SCn. As a result, positive wall voltage is formed on data electrodes D1-Dm. Voltage Ve1 is set to a value smaller than that of voltage Vs so that the wall charges on scan electrodes SC1-SCn and sustain electrodes SU1-SUn maintain the same polarity.

As described above, after applying sustain pulses for generating the last sustain discharge to scan electrodes SC1-SCn, an interval is provided before applying voltage for easing the voltage difference between the electrodes of display electrode pairs 24 to sustain electrodes SU1-SUn. In the embodiment, the interval is defined as erase phase-difference Th1.

According to the structure of the embodiment, a base-potential period ThG is set between a sustain pulse for generating a last sustain discharge and an immediately preceding sustain pulse to the sustain pulse in a sustain period, so that display electrode pairs 24 are clamped to ground potential as base potential for base-potential period ThG. The length of base-potential period ThG is changed according to the cumulative current-carrying time of panel 10. Especially on judgment by cumulative time calculating circuit 48, if the cumulative current-carrying time of panel 10 is not greater than a predetermined period (i.e., not greater than 500 h, in the embodiment), base-potential period ThG is set to 0 nsec. If the cumulative current-carrying time exceeds 500 h, basepotential period ThG is set to 500 nsec. Changing the length of base-potential period ThG allows an address operation to have stability with no need for increasing address pulse voltage Vd to cope with increase in the cumulative current-carrying time of a panel.

Although the embodiment introduces a structure where all of the sub-fields have base-potential period ThG and it is set to 0 nsec if the cumulative current-carrying time is not greater than a predetermined period; otherwise, it is set to 500 nsec, it is not limited thereto. For example, one-field may contain a sub-field having base-potential period ThG of 500 nsec used for the cumulative current-carrying time not greater than a predetermined period. Similarly, one-field may contain a subfield having base-potential period ThG of 0 nsec used for the cumulative current-carrying time that exceeds a predetermined period. According to the embodiment, a similar effect is obtained by a structure in which one-field contains at least one sub-field that extends the length of base-potential period ThG after the cumulative current-carrying time exceeds a predetermined period.

In the description above, base-potential period ThG is set to 0 nsec for the cumulative current-carrying time not greater than a predetermined period and ThG is set to 500 nsec for the cumulative current-carrying time greater than the predetermined period. These are cited merely by way of example and without limitation. For example, base-potential period ThG may be set to 100 nsec or 200 nsec for the cumulative currentcarrying time not greater than a predetermined period, and base-potential period ThG may be set to 400 nsec or 600 nsec for the cumulative current-carrying time greater than the predetermined period. These values should be optimally determined according to characteristics of a panel and specifications of a plasma display device, as long as the structure contains base-potential period ThG whose length can be extended after the cumulative current-carrying time exceeds a predetermined period.

Although the structure of the embodiment employs 500 hours for the predetermined period and changes the length of base-potential period ThG by judgment whether the cumulative current-carrying time exceeds 500 hours or not, it is not limited thereto. It should be optimally determined according to characteristics of a panel and specifications of a plasma display device. The following are possible structures:

having a plurality of thresholds, such as 500 h, 750 h, 1000 h, and extending the length of base-potential period ThG on a step-by-step basis each time the cumulative currentcarrying time exceeds each threshold;

increasing the proportion of sub-fields having extended base-potential period ThG in one-field.

In the structure of the embodiment, base-potential period ThG is changed after the cumulative current-carrying time exceeds a predetermined period, the timing of change is not limited thereto. As another possibility, the panel is driven on a driving waveform the same as before, even after the cumulative current-carrying time exceeds a predetermined period, until the plasma display device is turned off, and the length of base-potential period ThG is changed at the next turned-on timing of the device. For example, suppose that plasma display device 1 is in operation, i.e., timing-signal generating circuit 45 outputs timing signals for driving panel 10 when cumulative time calculating circuit 48 outputs a signal indicating that the cumulative current-carrying time exceeds a predetermined period. In this case, even after receiving the signal, timing-signal generating circuit 45 continues to output each timing-signal for driving panel 10 the same as those until the plasma display device is turned off. At a timing of next turning on the device and starting up the driving of panel 10, timing-signal generating circuit 45 a timing signal for extending the length of base-potential period ThG. Although changing the length of base-potential period ThG during operation of plasma display device 1 can cause a variation in luminance, the structure above protects the inconveniency and enhances the quality of image display.

Although the structure of the embodiment employs a discharge gas with a xenon partial pressure of 10%, it is not limited thereto. It should flexibly be determined suitable for the driving voltage of a panel.

Specific values seen throughout the description of the embodiment are cited merely by way of example and without limitation. They should be optimally determined according to characteristics of a panel and specifications of a plasma display device. Variations in these values can be tolerated as long as they are maintained within the range that ensures the aforementioned effects.

INDUSTRIAL APPLICABILITY

According to the structure of the present invention, a sustain period contains a base-potential period, during which the display electrode pairs are clamped to base potential, provided between the last sustain pulse of the sustain period and the immediately preceding sustain pulse. The length of the base-potential period is changed according to the cumulative current-carrying time of a panel. The structure eliminates the problem that address pulse voltage has to be set higher for longer cumulative current-carrying time of a panel, allowing the panel, even it is a panel with high luminance, to have a stable address discharge. The plasma display device and the method for driving the panel of the present invention offer excellent quality of display image.

The invention claimed is:

1. A plasma display device comprising:
   a plasma display panel having a plurality of discharge cells, each of the discharge cells including a display electrode pair formed of a scan electrode and a sustain electrode;
   a cumulative time calculating circuit for calculating a cumulative current-carrying time of the plasma display panel; and
   a driving circuit for driving the plasma display panel having a sustain-pulse generating circuit, the sustain-pulse generating circuit including:
       a power-recovery circuit for collecting electric power accumulated in an inter-electrode capacitor of the display electrode pair, and supplying the collected power to the display electrode pair; and
       a clamping circuit for clamping each display electrode pair to a power-supply voltage and a base potential,
   wherein, the display electrode pair is clamped to base potential, in a period between a sustain pulse for generating a last sustain discharge and an immediately preceding sustain pulse in a sustain period of each of a plurality of subfields, and
   a length of the period is increased when the cumulative current-carrying time calculated by the cumulative time calculating circuit exceeds a threshold, and a pulse width of the sustain pulse for generating a last sustain discharge and a pulse width of the immediately preceding sustain pulse are independent of the cumulative current-carrying time.

2. The plasma display device of claim 1, wherein the driving circuit extends the length of the period, during which each of the display electrode pair is clamped to base potential, in the sustain period of all sub-fields according to the cumulative current-carrying time.

3. The plasma display device of claim 1, wherein in a case where the period, during which each of the display electrode pair is clamped to base potential, is changed according to the cumulative current-carrying time, the driving circuit drives the panel with a driving waveform the same as before until the plasma display device is turned off, and from a timing of next turning-on of the device, the driving circuit changes the length of the period during which each of the display electrode pair is clamped to base potential.

4. The plasma display device of claim 1, wherein the driving circuit sets the period during which each of the display electrode pair is clamped to base potential before applying sustain pulses for generating the last sustain discharge to the scan electrode.

5. A method for driving a plasma display panel having a plurality of discharge cells, each of the discharge cells including a display electrode pair formed of a scan electrode and a sustain electrode, the method comprising:

providing a plurality of sub-fields in one-field, each of the sub-fields including an address period for selecting a discharge cell where a discharge is to be generated and a sustain period for generating a sustain discharge in the selected discharge cell in the address period;

setting a period, during which each of the display electrode pair is clamped to base potential, between a sustain pulse for generating a last sustain discharge and an immediately preceding sustain pulse in the sustain period of each of the plurality of subfields;

calculating a cumulative current-carrying time of the plasma display panel; and increasing a length of the period during which each of the display electrode pair is clamped to base potential when the calculated cumulative current-carrying time of the plasma display panel exceeds a threshold, wherein a pulse width of the sustain pulse for generating a last sustain discharge and a pulse width of the immediately preceding sustain pulse are independent of the cumulative current-carrying time.

6. The method for driving a plasma display panel of claim 5, wherein one-field includes at least one sub-field, where the length of the period during which each of the display electrode pair is clamped to base potential is extended, after the cumulative current-carrying time exceeds a predetermined period.

7. The method for driving a plasma display panel of claim 5, wherein the length of the period during which each of the display electrode pair is clamped to base potential is extended in all of the sub-fields after the cumulative current-carrying time exceeds a predetermined period.

* * * * *